E. K. DUNNE.
FIELD GLASS.
APPLICATION FILED MAR. 25, 1921.

1,428,478.

Patented Sept. 5, 1922.
2 SHEETS—SHEET 1.

WITNESSES

INVENTOR
EVERETT K. DUNNE
BY
ATTORNEYS

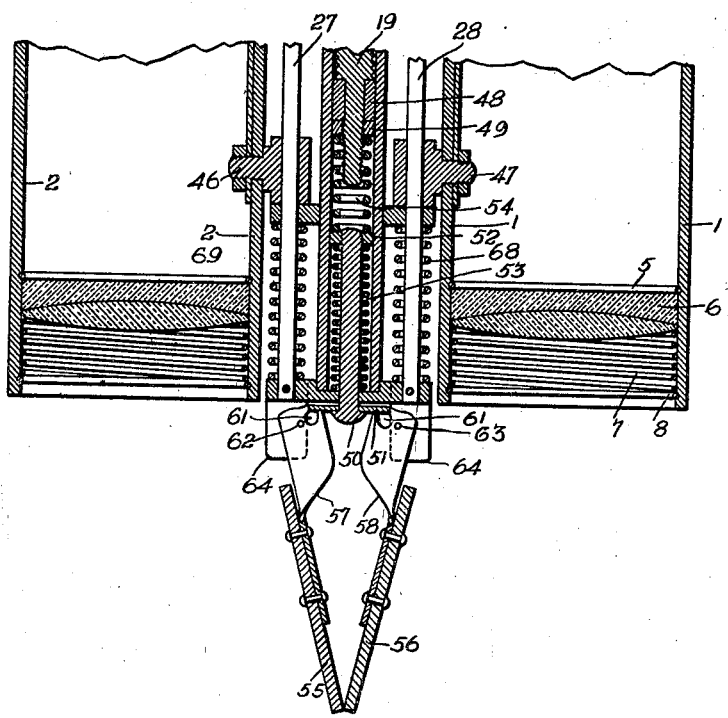
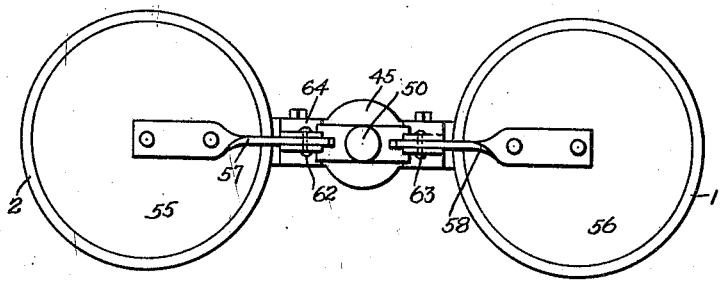
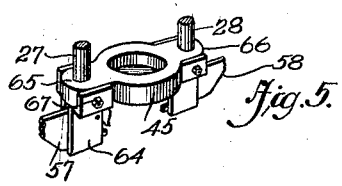

Patented Sept. 5, 1922.

1,428,478

UNITED STATES PATENT OFFICE.

EVERETT K. DUNNE, OF ONEONTA, NEW YORK.

FIELD GLASS.

Application filed March 25, 1921. Serial No. 455,418.

*To all whom it may concern:*

Be it known that I, EVERETT K. DUNNE, a citizen of the United States, and a resident of Oneonta, in the county of Otsego and State of New York, have invented a new and Improved Field Glass, of which the following is a full, clear, and exact description.

This invention relates to field glasses and has for an object to provide an improved construction wherein maximum size lenses may be used in a comparatively small holder.

Another object of the invention is to provide field glasses in which the parts are swung on parallel axes whereby they may be moved toward or from each other pivotally to secure the right distance to accommodate readily the eyes of any person.

A further object of the invention is to provide swinging barrel sections in field glasses together with means for producing a friction in the pivotal mountings so as to hold the barrel sections in any adjusted position.

Another additional object is to provide in field glasses, lids or end glasses which will automatically move to a closed position when the glasses are collapsed and will automatically move to an open position as the glasses are extended for use.

In the accompanying drawings—

Figure 3 is a view of the lower end of the structure shown in Figure 1, certain parts being shown in different positions.

Figure 4 is a bottom plan view of the structure shown in Figure 1.

Figure 5 is a detail fragmentary perspective view showing the lower part of a hinged structure embodying certain features of the invention.

Figure 1:
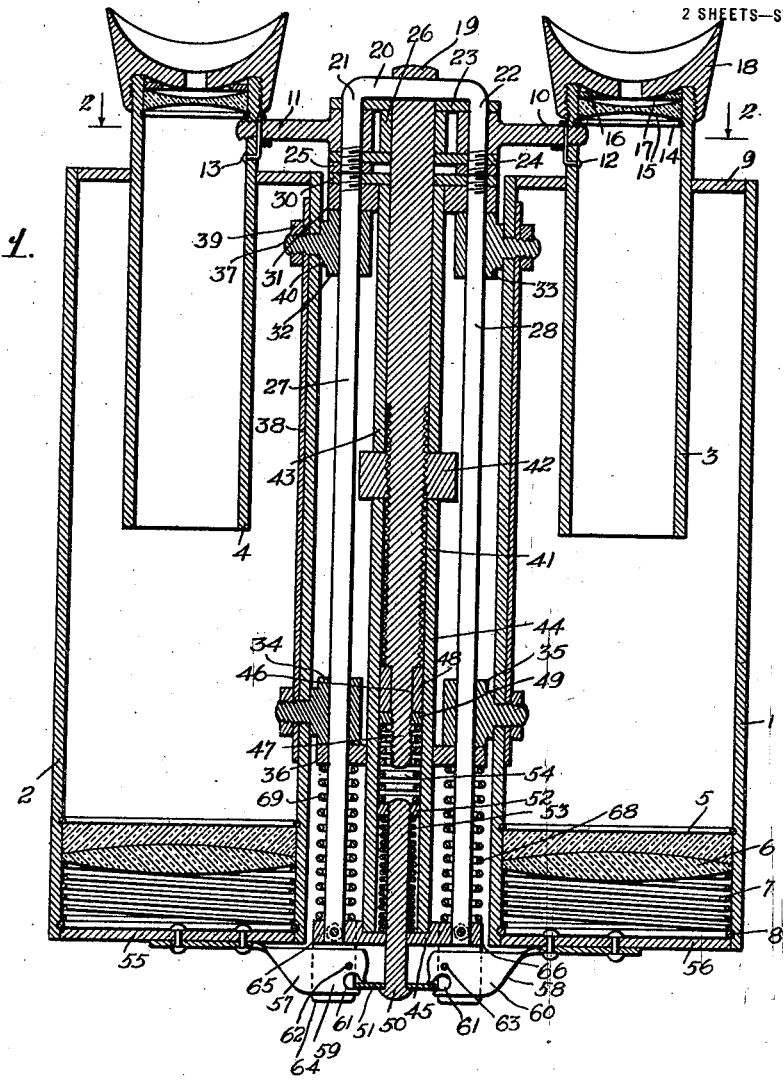
Figure 1 is a longitudinal vertical section through a field glass disclosing one embodiment of the invention.

Referring to the accompanying drawings by numerals, 1 and 2 indicate the primary barrel sections while 3 and 4 indicate the auxiliary barrel sections, said auxiliary barrel sections telescoping into the primary barrel sections. At the outer end of each of the primary barrel sections is arranged a groove in which a ring 5 is mounted which acts as a stop for the object lens 6 which object lens is held in place by a spring 7 and the spring 7 in turn is held in place by a retaining ring 8 mounted in a suitable groove in the barrel section 1. The spring 7 is under tension so as to press against the barrel section 1 as well as against ring 8 and lens 6. This spring if removed and released will become slightly greater in diameter and will become approximate twice as long as shown in the drawing. When compressed and restricted as shown in the drawing the spring acts as means for firmly holding the lens in place at a short distance from the outer end of the barrel section. This set back of the lens presents a hood or shading member for the lens in addition to presenting means which will be easily applied and removed for holding the lens in place and which will prevent rough usage from scratching or otherwise injuring the lens.

The description of one lens and associated parts will apply to both as they are identical. Arranged at the inner end of each of the barrel sections 1 and 2 is an end plate 9 soldered or otherwise rigidly secured in place and provided with a central aperture through which the sections 3 and 4 freely slide. Each of these sections is provided with a threaded aperture for receiving the respective threaded arms 10 and 11, an aperture for receiving the respective bracing wires 12 and 13 and a groove for receiving the respective retaining rings 14. Arranged adjacent each retaining ring 14 is an eye lens 15 and against this eye lens 15 is positioned a resilient washer 16 acted on by the curved bottom 17 of the eye piece 18 for causing the washer to resiliently press the eye lens against the ring 14. The eye piece 18 may be of rubber or other suitable material and is threaded onto the exterior of the auxiliary barrel section 3. Associated with the respective barrel sections is a centrally positioned shaft 19 having an aperture near the upper end through which a cross bar 20 of the pintles 21 and 22 extend. These pintles also extend through plates 23 and 24, said pintles being held in place by suitable nuts 25 screwed thereon. A bush or sleeve 26 surrounds the shaft 19 between plates 23 and 24 so that the nuts 25 may be screwed down tight and yet the arms 10 and 11 may freely swing on the pintles 21 and 22.

It will be noted from Figure 1 that the arms 10 and 11 are provided with enlargements having apertures through which the pintles 21 and 22 extend so that these pintles, arms 10 and 11 and associated parts form what may be termed a head which moves with the auxiliary barrel sections 3 and 4.

Secondary pintles 27 and 28 are threaded at one end into the plate 30 and extend through plate 31, the respective hinge members 32, 33, 34, 35 and plate 36. These hinge members are made identical so that the description of one will apply to all. It will be noted that the hinge member 32 is provided with a threaded extension 37 which extends through one or more of the barrel sections 2 through resilient strap 38 and carries a nut 39 at the end, which nut clamps the shoulder 40 of the hinge member tightly against the barrel section 2 and also clamps the strip 38 against the inner surface of said barrel section. The barrel section 2 is preferably tubular or circular in cross section while the strip 38 is preferably flat whereby when the nut 39 is tightened the resilient action of the flat resilient strip 38 will give a continuous friction or tension to the parts and thereby rigidly hold the parts together even if the apparatus is subjected to rough usage.

Figure 2:
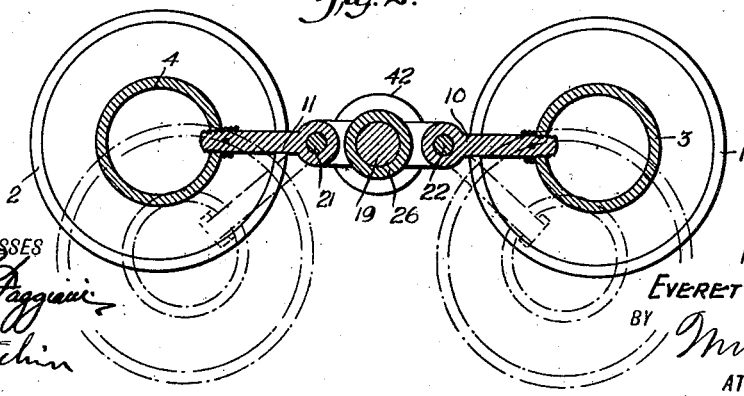
Figure 2 is a sectional view through Figure 1 on line 2—2.

By this construction and arrangement parallel axes are provided whereby the barrel sections may be swung toward and from each other as indicated in Figure 2 to accommodate large object lens or to accommodate the eyes of the person using the device.

The shaft 19 is provided with threads 41 for part of its length which threads co-act with the nut 42, which nut is held in a given position by a tube 43 and a tube 44, tube 43 having one end pressing against plate 30 while tube 44 has one end pressing against the opposite end plate 45. In this way the nut 42 is held against longitudinal movement but when rotated will reciprocate the shaft 19 and, consequently, will pull out or push in the auxiliary barrel sections 3 and 4. In addition, the shaft 19 is provided with a reduced section 46 having a threaded end 47, said reduced section carrying a sleeve 48 while a nut 49 is screwed onto section 47 and clamps the sleeve in place. When moving the barrel sections apart the sleeve 48 acts as a limit as this barrel section cannot enter the threaded nut 42. A pin 50 to which a plate 51 is rigidly secured extends through the center of the plate 45 and reciprocates therein, said pin having a nut 52 threaded on the inner end thereof whereby the spring 53 is confined in the sleeve or tube 44 and acts continually to move the parts from the position shown in Figure 1 to that shown in Figure 3. An oppositely acting spring 54 is arranged in the tube 44 with one end resting on nut 52 and the other on nut 49 so as to urge a pin 50 to the position shown in Figure 1 as the spring is compressed by the closing movement of the shaft 19. Preferably the spring 54 is stronger and stiffer than the spring 53 so as to readily overcome the same. Also the spring 54 is comparatively short and, consequently, will not begin to operate the pin 50 until the auxiliary barrel sections 3 and 4 are almost in their telescoped or nested position as shown in Figure 1. This arrangement of pin 50 and plate 51 has been provided in order to provide a ready and automatically actuated means for opening and closing the covers or lids 55 and 56. These lids may be of metal or other material and are intended to snugly fit the ends of the barrel sections 1 and 2. Identically formed plates 57 and 58 are riveted or otherwise secured to each of these lids and twisted to form upstanding lever sections 59 and 60. Each of these lever sections is provided with an opening 61 into which the ends of plate 51 project. These openings are so formed that as the pin 50 moves inwardly from the position shown in Figure 1 to the position shown in Figure 3, the lever sections 59 and 60 will be swung on their pivots 62 and 63 a sufficient distance to cause the lids 55 and 56 to come in contact at a central point. The pivot pins 62 and 63 are mounted in suitable brackets 64 which brackets are secured to the extensions 65 and 66 of plate 45, the securing means being preferably suitable bolts 67 (Fig. 5). The bolt 67 also passes through the lower end of the pintles 27 so as to lock the pintles to the plate 45 and, consequently, support this plate so that the extensions 65 and 66 may act as abutments for the springs 68 and 69 which springs also act on the plate 36 so as to give a pull on the pintles 27 and 28 and thereby cause friction to be created between plate 36 and hinge members 34 and 35 and between plate 31 and hinge members 32 and 33. This friction is not enough to be objectionable in moving the barrel sections but acts to hold the barrel sections in any adjusted position, as for instance, either in a full line or dotted line position illustrated in Figure 2.

In operation, when it is desired to use the field glasses the barrel sections 1 and 2 are grasped and swung to the desired position for causing the eyes to readily fit into or come opposite the eye pieces 18. The nut 42 is then rotated for securing the desired focus, the first part of the movement of shaft 19 causing the lids 55 and 56 to move to an open position as shown in Figure 3. The extension of the sections is continued until the desired focus is secured. The glasses are then used in the usual manner and when it is desired to lay the same aside, nut 42 is rotated in a reverse direction for causing the parts to telescope together and automatically causing the lids 55 and 56 to move to a closed position.

The term glasses or field glasses, has been used but it is to be understood that the invention is applicable to not only the ordinary field glass now in common use but to the prism binoculars and other instruments of the same general nature. It will, therefore, be understood that the term "field glasses" as used in the specification means any instrument to which it is applicable.

What I claim is:—

1. In a device of the character described, a U-shaped pivoting member, a pair of barrel sections pivotally connected to said U-shaped member, an auxiliary barrel section telescoping into each of the first mentioned barrel sections, means for rockably connecting the auxiliary barrel sections to said U-shaped member, and means for permitting the same to move in or out of said first mentioned barrel sections, said auxiliary sections being centrally arranged in said first mentioned barrel sections.

2. In a field glass of the character described a pair of primary barrel sections, spaced hinging members on the sections for pivotally mounting each barrel section so that it may swing toward and from the opposite barrel section independently thereof, an auxiliary barrel section slidingly mounted in each of the primary barrel sections and hinging members for pivotally mounting each of said auxiliary barrel sections independently of the primary barrel sections, said last mentioned hinging members being arranged with their pintles in line with the pintles of the first mentioned hinge members.

3. In a field glass of the character described, a pair of swinging barrel members, pivotal means for mounting said barrel members, each of said pivotal means having a threaded extension projecting into the barrel member, a resilient flat strip fitting over said extension, and a clamping nut for pressing said strip against said barrel member whereby there will be a continuous gripping action for holding the barrel member rigid to the pivotal member.

4. In a pair of field glasses a pair of barrels formed with primary barrel sections and sliding auxiliary barrel sections, means for telescoping said sections, a lid for the end of said primary barrel sections carrying the object lens, a lever for moving each of said lids to an open and a closed position and spring actuated means for automatically moving said levers to open said lids when the auxiliary barrel sections have been moved longitudinally to an operative position.

5. In a field glass of the character described a barrel provided with a pair of spaced grooves adjacent one end of the barrel, a resilient ring arranged in each of said grooves, said ring acting as an abutment, an object lens arranged against the innermost of said rings and a coil spring having one end resting against the other ring and against said lens for firmly holding the lens in a given position.

6. In a field glass of the character described a barrel provided with a primary barrel section and an auxiliary barrel section, said auxiliary barrel section being provided with a groove at one end, an eye lens arranged against said retaining ring, a retaining ring arranged within said groove, a flat resilient ring arranged in said auxiliary barrel with one edge resting against the periphery of said lens and an eye piece threaded onto said auxiliary barrel section, said eye piece being formed with a curved section adapted to press against the inner circumference of said washer and deform the same whereby said washer will resiliently press said eye lens against said abutment.

EVERETT K. DUNNE.